Sept. 4, 1934.  C. R. WASEIGE  1,972,176
CHANGE SPEED TRANSMISSION
Filed April 13, 1932   3 Sheets-Sheet 1
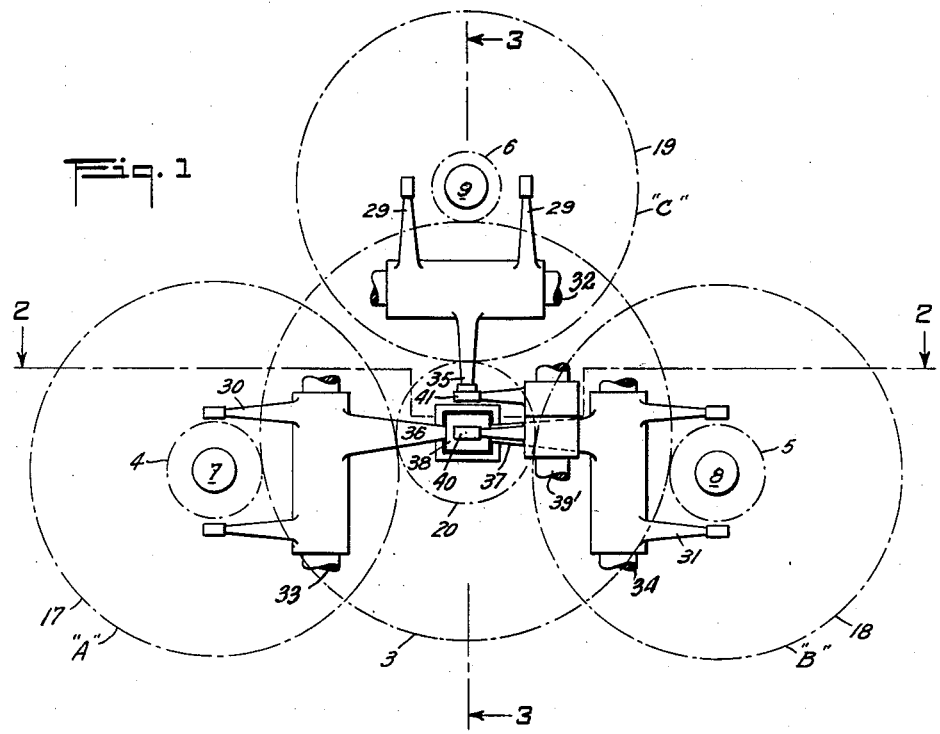
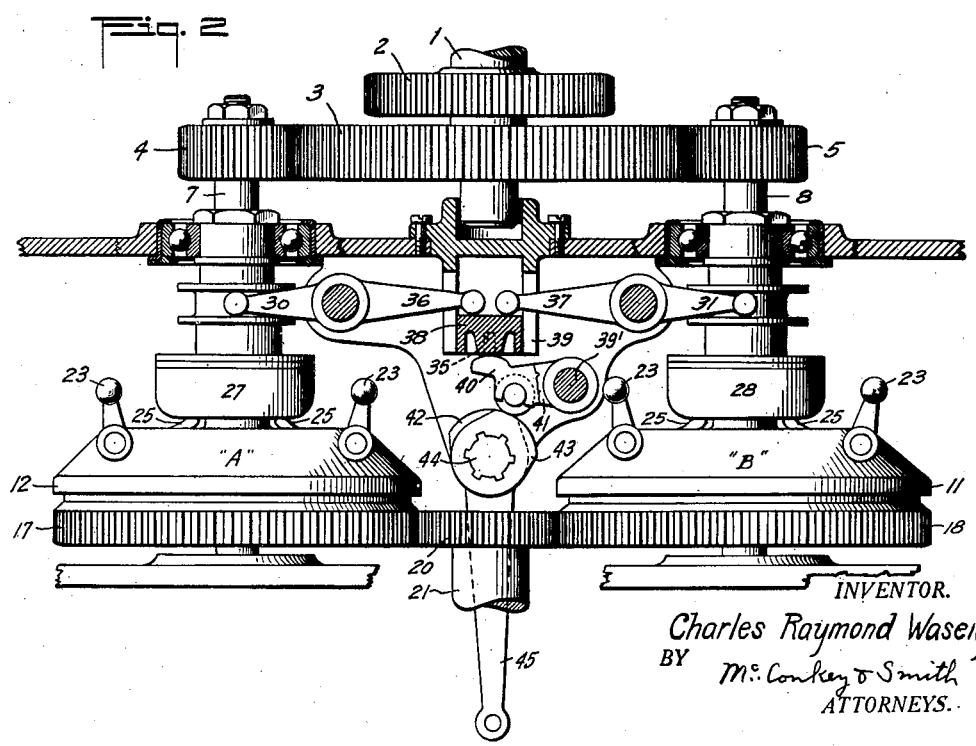
INVENTOR.
Charles Raymond Waseige
BY McConkey & Smith
ATTORNEYS.

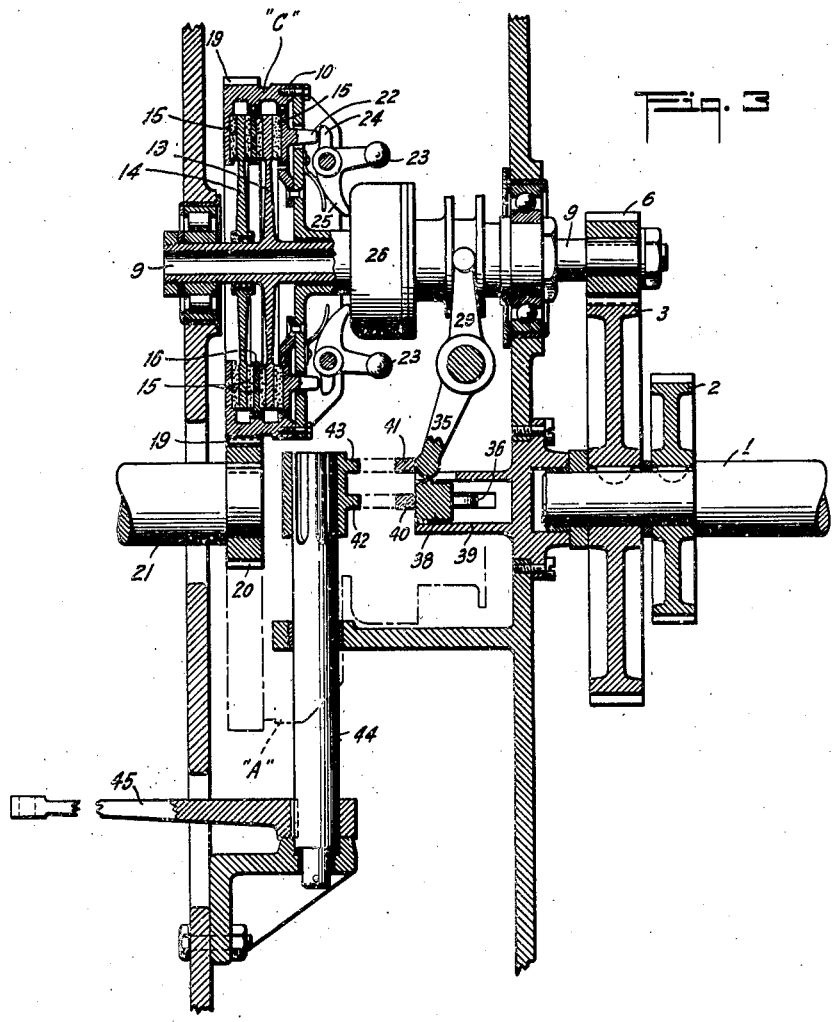

Sept. 4, 1934.  C. R. WASEIGE  1,972,176
CHANGE SPEED TRANSMISSION
Filed April 13, 1932   3 Sheets-Sheet 3

INVENTOR.
Charles Raymond Waseige
BY McConkey & Smith
ATTORNEYS.

Patented Sept. 4, 1934

1,972,176

UNITED STATES PATENT OFFICE 1,972,176

CHANGE SPEED TRANSMISSION

Charles Raymond Waseige, Rueil-Malmaison, France, assignor, by mesne assignments, to Eclipse Aviation Corporation, East Orange, N. J., a corporation of New Jersey Application April 13, 1932, Serial No. 605,096 In France April 24, 1931

8 Claims. (Cl. 74—59)

This invention relates to a change speed transmission but more particularly to a change speed transmission system adapted to function in assemblies operating at high rates of speed.

Heretofore it has been proposed to drive the compressors of airplane motors so as to permit the selection of several speeds between the crank shaft and compressor and in such a way that the compressor is constantly driven by the engine crank shaft at a speed equal to or superior to the latter.

In my French Patent 668,021 filed January 25, 1929, there is disclosed a transmission by which the compressor may be driven through selectable trains of gears. The trains embody clutches adapted to be closed by centrifugal elements such as flyballs and opened when the elements are precluded from swinging. The opening and closing of the clutches may be selected by the actuation of sleeves associated with the clutches and designed in one of their positions to contact the centrifugal elements and preclude their swinging. To effect this selection a plurality of operating levers are utilized.

The object of this invention is to provide a control whereby the gear trains may be selectively engaged by means of a single lever.

In the drawings:

Fig. 1 is a schematic representation of the layout of the system.

Fig. 2 is a section at 2—2 on Fig. 1.

Fig. 3 is a section at 3—3 on Fig. 1.

Figure 4:
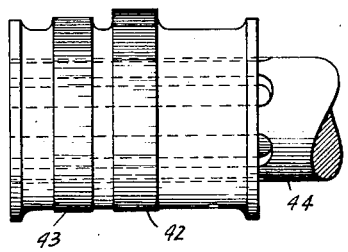
Fig. 4 is a side elevation of the double cam.
Figure 5:
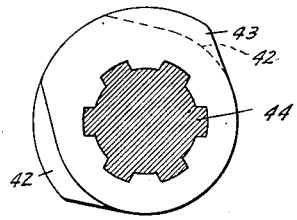
Fig. 5 is an end elevation of the double cam.
Figure 7:
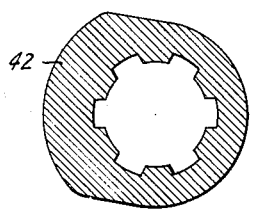
Fig. 7 is a plan of the cam which opens the high speed clutch.
Figure 6:
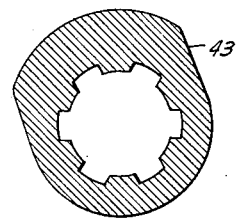
Fig. 6 is a plan of the cam which opens the intermediate speed clutch.

A driving shaft 1 carries pinions 2 and 3 splined thereon, pinion 3 meshing with gears 4, 5 and 6 fixed to transmission shafts 7, 8 and 9. Shaft 9 is the transmission shaft of an intermediate speed gear train, while shafts 7 and 8 are the transmission shafts of two high speed gear trains of equal ratio. Two high speed trains are utilized to overcome the unbalance that a single train would entail when rotating at the elevated speeds here contemplated. Mounted loose on shafts 7, 8 and 9 are members 10, 11 and 12 which constitute the driving members of centrifugal clutches broadly designated A, B and C.

The driven members of the clutches consist of discs 13 and 14 fixed to shafts 7, 8 and 9 and provided with friction faces 15 designed to frictionally engage annular discs 16, likewise furnished with friction faces 15 and carried by driving members 10, 11 and 12. The driving members 10, 11 and 12 carry integral therewith on their peripheries gears 17, 18 and 19 meshing with pinion 20 splined to drive shaft 21. It is obvious that when the clutches A, B and C are closed they complete gear trains between the driving and driven shafts. The gear ratios of the trains are so designed that the train, of which clutch C forms a part, represents an intermediate speed transmission, while clutches A and B are interpolated in identical high speed trains.

Projecting from the driving members of clutches A, B and C are nodules 22 adapted, when moved inwardly, to press together the friction faces 15 of the elements 13, 14 and 16 and thus close the clutches. Flyballs 23 pivoted on the driving elements 10, 11 and 12 of the clutches are provided with projections 24, adapted to engage and press forward the nodules 22 in certain positions of the flyballs and are also provided with projections 25 which engage sliding sleeves 26, 27 and 28. The sleeves when advanced on the shafts 7, 8 and 9 retract flyballs 23 to relieve the axial component of centrifugal force pressing projections 24 on the nodules 22 and thus permit the clutches to open. Means such as springs (not shown) are associated with the clutches to open them as soon as pressure is relieved from the nodules 22.

The sliding sleeves 26, 27 and 28 contact forks 29, 30 and 31 that are pivoted respectively at 32, 33 and 34. The forks carry fingers 35, 36 and 37, 36 and 37 overriding a sliding member 38 positioned in a guideway 39. With this construction it is obvious that on actuation of member 38 the ends of fingers 36 and 37 will be constrained to move together to open or permit closing of clutches A and B simultaneously. Pivoted on an axis 39' are two pawls 40 and 41 (Figs. 8–10) designed to be contacted by two cams 42 and 43 (Figs. 4–7) rigid on the same carrying member 44 that is fixed to an operating lever 45.

Figure 8:
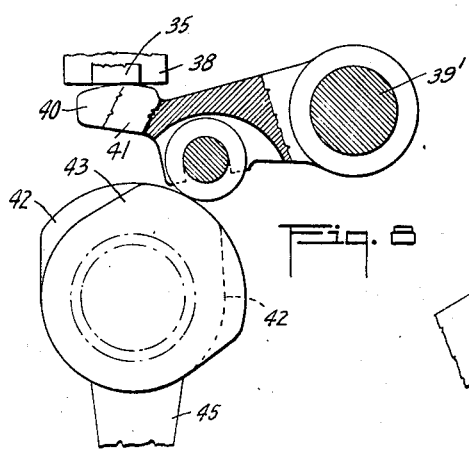
Fig. 8 shows the position of fingers 40 and 41 for open position of the high and intermediate train clutches.
Figure 9:
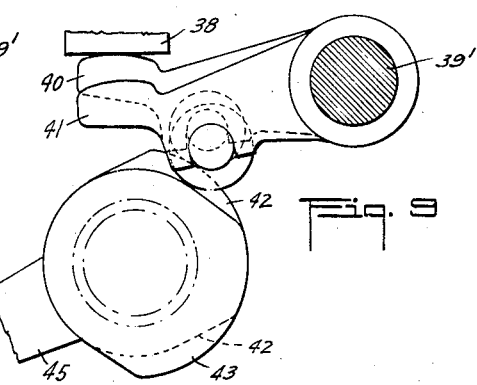
Fig. 9 shows the position of fingers 40 and 41 for high speed train clutch open, intermediate speed train clutch closed.
Figure 10:
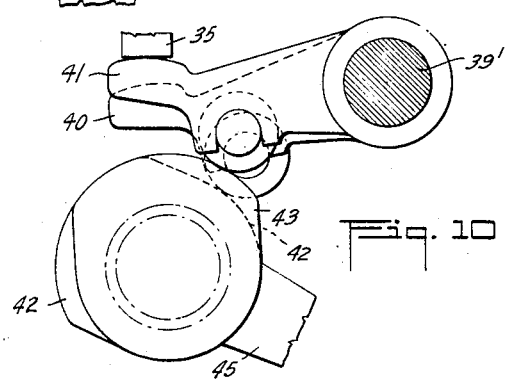
Fig. 10 shows the position of fingers 40 and 41 for high speed train clutch closed, intermediate speed train clutch open.

The cam 40 is designed to operate against sliding member 38 to move fingers 36 and 37 while cam 41 operates against finger 35 directly. Considering Fig. 1 when all the fingers are raised (Fig. 8) clutches A, B and C are opened; when only finger 35 is raised (Fig. 10) clutch C only is opened and when only fingers 36 and 37 which are constrained to move together, are raised (Fig. 9) only clutches A and B are opened. Cams 40 and 41 are so formed as to permit the above selection thru the adjustment of operating lever 45 into three positions, as indicated in Figures 8, 9 and 10.

The operation of the device is obvious from what has preceded. It is to be noted that when clutches A, B and C are opened, the compressor is entirely disconnected from the crank shaft. There may be incorporated in the device a free wheel similar to that of my French Patent 663,021 but addition of the free wheel precludes isolation of the engine and compressor. However, in certain installations three speeds of compressor may be deemed more desirable than the ability to disconnect compressor and engine while permitting selection of either of two speeds.

It is to be understood that the above described constructions are only exemplary and may be replaced by mechanical equivalents without departing from the scope of the invention.

Having described my invention what I claim as new and wish to protect by Letters Patent is:—

1. In a change speed transmission system a driving shaft, a driven shaft coaxial thereof and spaced therefrom, a plurality of gear trains operatively connecting the shafts having parallel shafts defining a central space, clutches in the trains, centrifugally operated elements to engage the clutches, means adapted to preclude operation of said elements and means including a cam within said central space for actuating said first mentioned means, said cam being arranged between the adjacent ends of the driving and driven shaft.

2. In a change speed mechanism, a driving shaft, a coaxial driven shaft spaced therefrom, a plurality of gear trains including clutches for connecting said shafts in various speed ratios, said clutches being arranged radially about the axis of the shafts, an operating lever for each clutch having its inner end terminating adjacent the axis of the shafts and between the ends thereof, and means including a plurality of cams operable by a single lever and arranged to selectively engage the ends of said first named levers to control said clutches.

3. In a change speed mechanism, a driving shaft, a coaxial driven shaft spaced therefrom, a plurality of gear trains including clutches for connecting said shafts in various speed ratios, said clutches being arranged radially about the axis of the shafts, an operating lever for each clutch having its inner end terminating substantially at the axis of the shafts and between the ends thereof, a rock shaft extending transversely of said driving and driven shafts rotatable about an axis intersecting the driving and driven shaft axis, and cams on said rock shaft adjacent the inner ends of the levers arranged to selectively operate said levers to control the clutches.

4. In a change speed mechanism, a driving shaft, a driven shaft, a plurality of gear trains including clutches for connecting said shafts in various speed ratios, said clutches being arranged radially about the axis of the shafts, an operating lever for each clutch extending toward the axis, said levers being pivotally mounted on shafts having axes lying in planes at right angles to the driving and driven shaft axes, a rock shaft rotatable about an axis intersecting the driving and driven shafts and lying in a plane parallel to the lever shaft axes, and means on said rock shaft adapted to selectively operate the levers to control the clutches.

5. In a change speed mechanism, a driving shaft, a driven shaft, a plurality of gear trains including clutches for connecting said shafts in various speed ratios, said clutches being arranged radially about the axis of the shafts, an operating lever for each clutch extending toward the axis, a rock shaft extending transversely of said driving and driven shafts rotatable about an axis intersecting the driving and driven shafts, said levers having end portions adjacent the rock shaft, the end portion of one lever being displaced axially of the rock shaft with respect to another lever end portion, and axially displaced cams on said rock shaft adapted to actuate said levers to control the clutches.

6. In a change speed mechanism, a driving shaft, a driven shaft coaxial therewith and axially spaced therefrom, a plurality of gear trains connecting said shafts including gear shafts radially spaced from said driving and driven shafts to define a space between the ends of the shafts, a clutch for each gear train, a lever for each clutch extending toward the center of the space, and a cam shaft extending within said space adapted to actuate said levers to control the clutches.

7. In a change speed mechanism, a driving shaft, a driven shaft coaxial therewith and axially spaced therefrom, a plurality of gear trains connecting said shafts including gear shafts radially spaced from said driving and driven shafts to define a space between the ends of the shafts, a clutch for each gear train, a lever for each clutch extending toward the center of the space, a rock shaft within the space rotatable about an axis intersecting the driving and driven shafts, and axially spaced cams thereon adapted to operate the levers in sequence to control the clutches.

8. In a change speed mechanism, a driving shaft, a driven shaft coaxial therewith and axially spaced therefrom, a plurality of gear trains connecting said shafts including gear shafts radially spaced from said driving and driven shafts to define a space between the ends of the shafts, a clutch for each gear train, a lever for each clutch extending toward the center of the space, two of said gear shafts being disposed diametrically of the driving and driven shafts, the levers of the clutches corresponding to the diametrically disposed shafts having the inner ends of their levers in the same plane, a rock shaft extending within the space, cams on said rock shaft for actuating said levers, and means including one of said cams for actuating the levers of the diametrically arranged clutches concurrently.

CHARLES RAYMOND WASEIGE.